United States Patent [19]

Mende

[11] 3,969,194

[45] July 13, 1976

[54] METHOD AND APPARATUS FOR THE PURIFICATION OF A LIQUID CONTAMINATED WITH RADIOACTIVE SUBSTANCES

[75] Inventor: Hanns Mende, Bad Nauheim, Germany

[73] Assignee: Luwa AG, Zurich, Switzerland

[22] Filed: Oct. 29, 1974

[21] Appl. No.: 518,806

[30] Foreign Application Priority Data
Oct. 30, 1973   Switzerland........................ 15242/73

[52] U.S. Cl.................................... 203/40; 202/158; 159/17 VS; 159/18; 159/15; 159/DIG. 12; 261/114 A
[51] Int. Cl.²....................... B01D 3/00; B01D 3/14; B01D 1/26; B01D 47/00
[58] Field of Search................. 159/18, 31, DIG. 12, 159/15, 17 VS; 202/158; 261/114 R, 114 A, 114 JP, 114 TC; 203/40; 252/301.1

[56] References Cited
UNITED STATES PATENTS

| | | |
|---|---|---|
| 1,608,416 | 11/1926 | Newton............................ 261/114 R |
| 2,693,350 | 11/1954 | Ragatz............................. 261/114 R |
| 2,926,754 | 3/1960 | Ragatz................................ 202/158 |
| 3,105,862 | 10/1963 | Doering, Jr...................... 202/158 X |

*Primary Examiner*—Jack Sofer
*Attorney, Agent, or Firm*—Werner W. Kleeman

[57] ABSTRACT

A method of and apparatus for the purification of a liquid contaminated with radioactive substances, wherein the liquid is infed to an evaporator in or with which there is connected a column having a multiplicity of superposed plates or floors. The vapor generated in the evaporator is guided through a washing or scrubbing liquid uniformly distributed at the floors and flowing in crosswise counterflow with regard to the vapor. The washing liquid at the floors is deflected a number of times in such a manner that the washing liquid itself and together with the droplets entrained by the vapor is uniformly admixed and the washing liquid subjected to a constant intake of the radioactive substance.

7 Claims, 7 Drawing Figures

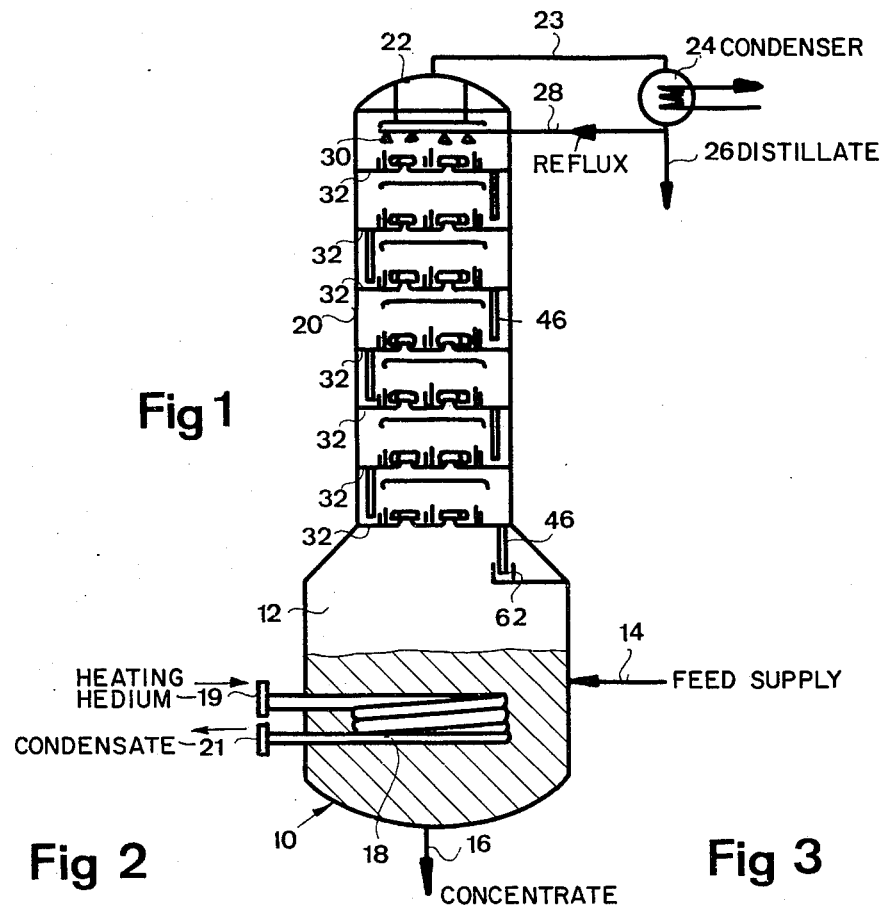
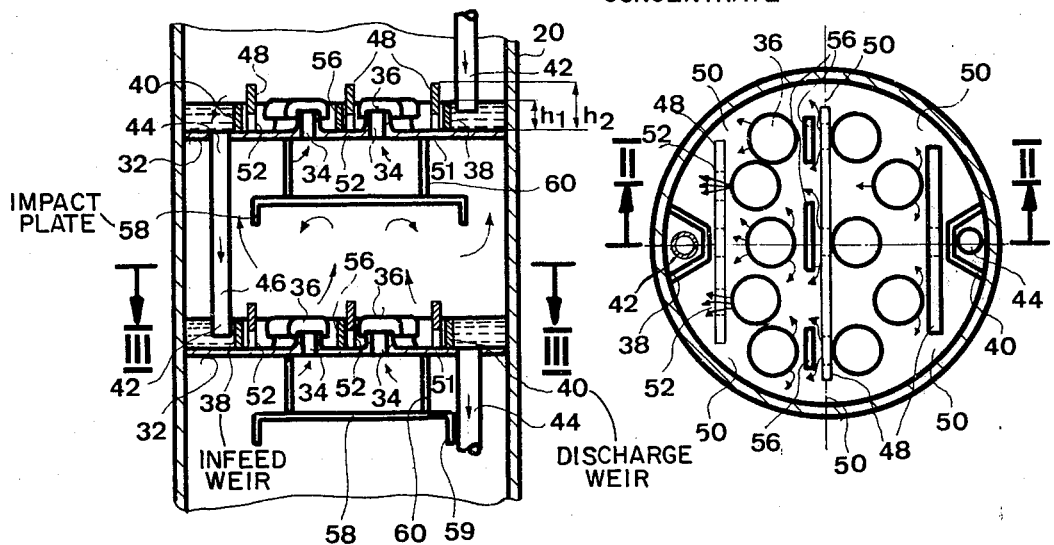

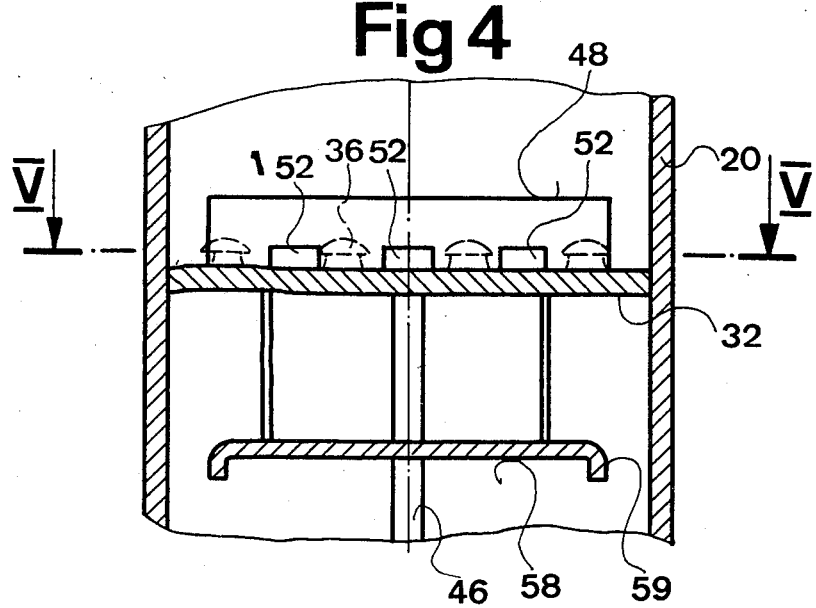
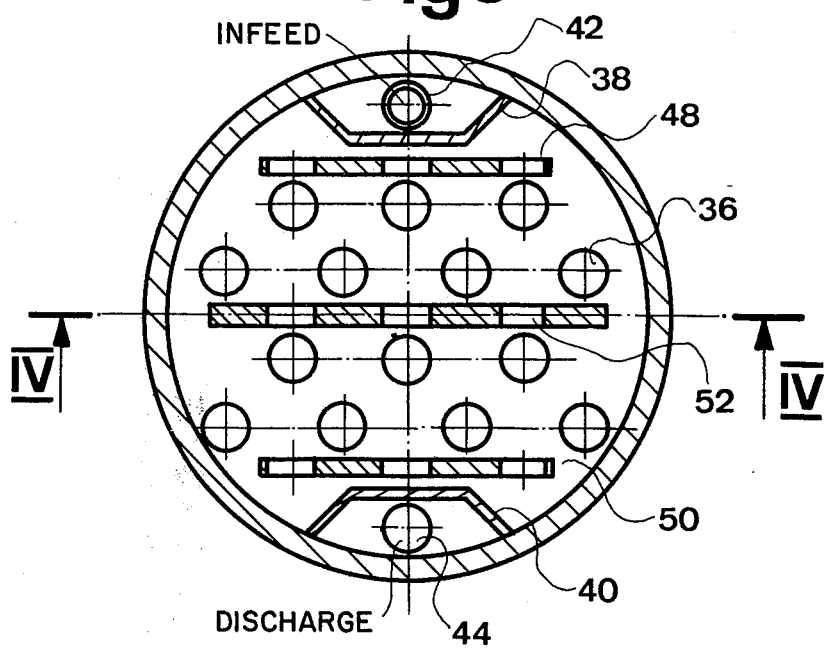

METHOD AND APPARATUS FOR THE PURIFICATION OF A LIQUID CONTAMINATED WITH RADIOACTIVE SUBSTANCES

BACKGROUND OF THE INVENTION

The present invention relates to a new and improved method of and apparatus for cleaning and purifying a liquid contaminated with radioactive substances, wherein the liquid is fed into a evaporator in or at which there is operatively connected a column having a multiplicity of superposed plates or floors, and wherein the vapor generated in the evaporator is guided through a washing liquid uniformly distributed at the floors and flowing in crosswise countercurrent or counterflow with respect to the vapor.

Owing to the requirements regarding protection of the environment is is increasingly necessary to eliminate from liquids contaminated with radioactive substances the contaminants prior to depositing the same in the open waters or waterways. Such purification of the liquid is particularly required in those situations where there is present liquids or waste water charged with radioactive substances. The radioactivity is indicated in microcuries per $cm^3$ ($uCi/cm^3$) or in Curies per $m^3$ ($Ci/m^3$). According to the generally applicable standards waste water which possesses long-life radioactive substances and should be deposited into the open waterways should possess a radioactivity which is smaller than $10^{-7}$ $Ci/m^3$.

It is known that in the case of radioactive waste water it is not the water which is the carrier of the radioactivity. Such is quite to the contrary bound to the dissolved salts or suspended solid particles, such as for instance non-dissolved salts, oxides, metal abrasions or dust and the like.

According to a known technique the radioactive waste water is evaporated, and the vapor and the droplets entrained thereby guided through a washing or scrubbing liquid. Consequently, a large portion of the droplets are transferred to the washing liquid. The droplets are admixed with the washing liquid, whereby the radioactive substance contained in the droplets is thinned out or diluted by the washing liquid i.e. concentrated in the washing liquid. As a result the radioactivity per unit of volume, is lowered for instance per $cm^3$. Additionally, the droplets entrained by the vapor are separated out in droplet separators which in each case are arranged above the floors. These droplet separators are constructed as demisters and fabricated from pressed mats formed of steel wool or similar material.

Due to the separation of the droplets in such demister there occurs therein an enrichment of contaminants containing radioactive substances, which remain adherent to the fabric of the demister. Consequently, the radioactivity is increased within the column. Due to a simple flushing of this column, i.e. the floors and the demister, experience has shown that there cannot be realized any satisfactory detachment of such radioactive substances.

Furthermore, there are known columns with a multiplicity of floors. Upon these floors there is arranged apart from an inflow weir and an outflow weir, rendering possible a uniform distribution of the liquid at the column floors, an impact plate which is attached above a column floor. This impact plate renders possible deflecting the vapor penetrating through the floors and through the liquid collected at the floors respectively, wherein the droplets entrained by the vapor stream are partially separated out of the vapor stream. Due to this type of droplet separation there is achieved the result that there cannot occur at any location of the column an impermissible enrichment of radioactive substances.

When using these two state-of-the-art techniques there has however been found that owing to the droplet separation itself there cannot be attained the required end concentration in the distillate; this can only be achieved by considerably increasing the quantity of washing liquid. This measure however requires a considerable expenditure in thermal energy inasmuch as the additional washing liquid together with the contaminated liquid must be evaporated. Furthermore it is necessary to enlarge the floor diameter through which there must penetrate the vapor and with it the entrained droplets. Also these measures constitute an increase in the expense of the entire installation.

SUMMARY OF THE INVENTION

It is therefore a primary object of the present invention to provide an improved method of, and apparatus for, the purification of a liquid contaminated with radioactive substances in a manner not associated with the aforementioned drawbacks and limitations of the prior art proposals.

Another object of this invention is the provision of a method and apparatus which render possible reducing the concentration of the radioactive substance in the droplets entrained by the vapor out of a washing liquid in an economical manner.

The method of the previously mentioned type of this development is manifested by the features that the washing liquid is deflected a number of times at the floor in such a way that the washing liquid itself together with the droplets entrained by the vapor are uniformly admixed, and the washing liquid subjected to a constant increase or intake of the radioactive substance.

A further aspect of the invention is the provision of apparatus for the performance of the aforesaid method which is of the type possessing an evaporator as well as a column connected therewith, the column being provided with a multiplicity of floors. Each floor has operatively associated therewith an infeed connection and an outfeed connection with associated infeed weir and outfeed weir. Further between the infeed air and the outfeed weir there are arranged a multiplicity of guide walls, and the ends of the guide walls together with the inner wall of the column limit throughpassages.

Due to the deflection of the washing or scrubbing liquid at the column floors there is achieved the result that the entire washing liquid is uniformly admixed thereat and thus there are prevented so-called dead zones. This admixing brings about that in all of the washing liquid zones there prevails approximately a uniform radioactivity.

This effect renders possible a reduction in the quantity of washing liquid, resulting in a reduction in the required heat of vaporization. Reduction of the vaporization heat is of course of comparable significance to an increase of the economies of the inventive method.

It has been further found that with the inventive apparatus the drop in radioactivity from one floor to the other is increased in contrast to the heretofore known equipment. The reason for this resides in the fact that the droplets entrained by the vapor stream from one floor to the other possess a concentration of dissolved salts or suspended solid particles which on the average is less than that of the droplets produced in the known methods and apparatuses. Since the quantity of dissolved salts or suspended solid particles decreases per unit of volume, the radioactivity also reduces.

It is indeed so that at the floors of the known devices there are present zones with a very small radioactivity. One such zone is constituted by the central floor portion which extends from the infeed connection to the removal or outfeed connection. However in this case the radioactivity in the marginal zones is so high that the droplets entrained from these zones by the vapor more markedly load on the average the next higher floor than the droplets which are entrained by the vapor streams with the inventive method and in the inventive apparatus respectively.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 illustrates an evaporator with connected column;

FIG. 2 is a cross-sectional view through the column along the line II-II of FIG. 3 in the form of an enlarged sectional detail of the column shown in FIG. 1;

FIG. 3 is a plan view along the line III-III of FIG. 2;

FIGS. 4 and 4 illustrate in respective vertical and plan sectional views a further arrangement possibility of the guide walls at the column floors.

DETAILED DESCRIPTION OF THE PREFERRED EMBODIMENTS

Figure 6:
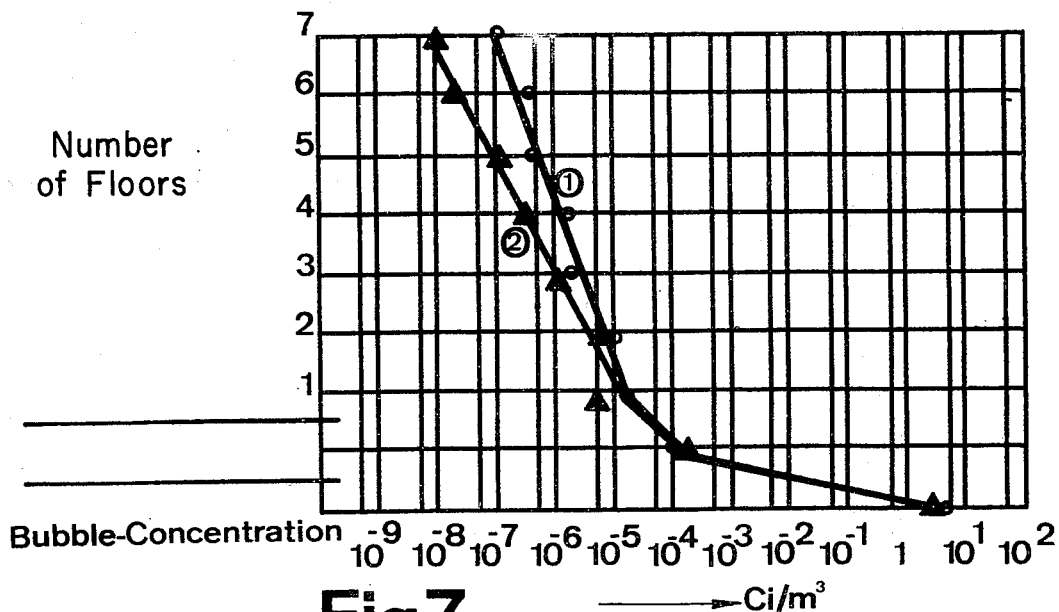
FIGS. 6 and 7 illustrate respective graphs or diagrams which portray the decrease in radioactivity as a function of the number of floors.

Describing now the drawings, in FIG. 1 reference character 10 illustrates a cleaning or purification apparatus. The cleaning apparatus 10 possesses an evaporator 12 at which there are connected a supply connection 14 as well as a discharge connection 16. In the evaporator or vaporizer 12 there is arranged a heating coil 18 which is connected with an inlet or inflow connection 19 and an outflow or discharge connection 21.

At the evaporator 12 there is directly connected a column 20 with a column head 22. A connection conduit or line 23 leads from the column head 22 to a condenser 24 which in turn is connected with a distillate removal line or conduit 26. Connected with the distillate removal line 26 is a return flow line or conduit 28 which extends into the column 20 at the region of the column head 22 and connected with distributor nozzles 30. Now in the column 20 floors or plates 32 are arranged at an axial spacing with regard to one another. In each floor 32 there are provided a plurality of nipples 34 (FIG. 2) defining openings which in each case are covered by a bell member or bubble cap 36 or equivalent structure. Arranged at each floor and diagonally opposite to one another are an inflow or infeed weir 38 as well as an outflow or discharge weir 40. The inflow weir 38 cooperates with an inflow duct portion or duct 42 while there is associated with the outflow weir 40 a removal or discharge duct portion or duct 44. The inflow duct portion or connection 42 as well as the removal duct portion or connection 44 form the relevant ends of a duct 46 which successively guides the washing liquid from one floor 32 to the other.

Guide walls 48, as best seen by referring to FIGS. 2 and 3, are arranged between the inflow weir 38 and the outflow weir 40 at right angles to the flow path between the infeed duct or connection 42 and the outfeed duct or connection 44, these guide walls 48 being located in spaced relationship from one another. The ends of the guide walls 48 together with the column housing 20 delimit or bound throughpassages 50. The height $h2$ (see FIG. 2) of the guide walls 48 is greater than the height $h1$ of the infeed weir and outfeed weir respectively. At each lengthwise edge 51 of the guide walls 48, which meets the floor 32, there are provided openings 52. These openings 52 are advantageously arranged at the neighborhood of the bell or globe members 36. The portions of the bell members 36 directed towards the removal or outflow duct 44 are screened relative to the openings 52 by obstruction walls 56. The obstruction walls or baffles 56 are arranged in parallelism to and in spaced relationship to the relevant guide wall 50.

In FIGS. 4 and 5 there is illustrated a further possibility of the arrangement of the guide walls 48 and their openings 52 relative to the bell members 36. In this arrangement care is taken that the nipples 34 and bells 36 proximate the guide walls 48 which are closer to infeed duct 42, always come to lie in front of an opening 52 thereby being impinged by liquid flow, whereas the nipples 34 and bells 36 proximate guide walls 46 which are closer to the removal duct 44, always come to lie between two openings 52. This arrangement of the bell members or globes renders it possible to dispense with the use of the obstruction walls or baffles 56.

Above each floor 32 there is arranged an impact plate 58 which is secured via attachment rods 60 at the next upper situated wall 32.

During operation of this purification apparatus 10 the liquid to be cleaned or purified is infed via the supply connection 14 to the evaporator 12. The heating coil 18 is supplied via the infeed connection 19 with a heat carrying medium, for instance vapor. The thus resulting condensate is withdrawn via the outflow line 21. Due to the thermal effect of the heating coil 18 the liquid to be cleaned or purified evaporates, and the vapor ascends through the nipples 34 of the floor 32 towards the column head 22. The vapor arrives via the connection conduit 23 in the condenser 24 where the vapor is condensed. The entire condensate is initially returned back to the column 20 via the return flow line 28 where it is sprayed by means of the distributor nozzles 30 over the uppermost column floor 32. At this location the liquid collects for such time until it has reached the height of the outflow or discharge weir 40 and via such and the duct 46 flows to the next lower floor 32 and fills infeed weir 38. This lasts for such length of time until each floor is covered with the liquid and by means of the duct 46 the lowermost floor 32 fills a cup 62 which prevents the ascending vapor from directly climbing through the duct 46 into the next higher floor.

The liquid is now uniformly distributed at each floor 32 by the guide walls 48 and admixed such that each zone thereof is uniformly acted upon. The ascending vapor which is introduced via the nipples 34 and the bell members 36 into the liquid enters through the liquid collected about the bell members 36 and places such into a movement which radially emanates from the bell members 36. Consequently, the liquid is partially ejected through the openings 52 towards the infeed duct 42, whereby there can occur an intensified admixing of the liquid. The vapor flowing out of the bell members 36 in the direction of the removal duct 44 arrives at the neighborhood of the guide walls 48 at the obstruction walls or baffles 56 (FIGS. 2, 3) and directly at the guide walls 48 (FIGS. 4, 5) and is deflected. Consequently, the liquid cannot be ejected through the openings 52.

The resultant throughflow speed of the liquid between the infeed duct and the removal duct is defined by the supplied fluid quantity per unit of time. Now since the partial speed vectors are partially directed towards the entire flow direction, it is necessary that these partial speed or velocity vectors must assume a significant magnitude in order to provide the necessary resulting throughpassage speed or velocity.

Upon vapor penetrating the liquid layer the vapor always again entrains new droplets towards the next higher floor 32. Consequently, the vapor impinges against the impact plate 58 where it is laterally deflected (FIG. 2). Due to the increased inertia of the droplets relative to the vapor the droplets impact against the plate 58 and drip down the flexed edges 59 back to the floor 32.

All of these measures serve the purpose of distributing as much as possible the liquid at each floor and admixing the same in order that the droplets which have arrived in the vapor and have been entrained in the liquid along with their dissolved salts or suspended solids can be uniformly distributed in the liquid over each floor, and the entrained droplets on the average possess a smaller radioactivity.

It is naturally also possible, instead of the described floors 32 with the bell members 36, i.e. the so-called bell bands, to also use valve floors or sieve floors.

The liquid with radioactive dissolved salts or suspended solids flows into the evaporator 12 and upon reaching a certain radioactivity are removed from the evaporator 12 by means of the discharge connection 16.

EXAMPLE

The functional reliability of the inventive method and the inventive apparatus will be explained based upon two examples.

Figure 7:
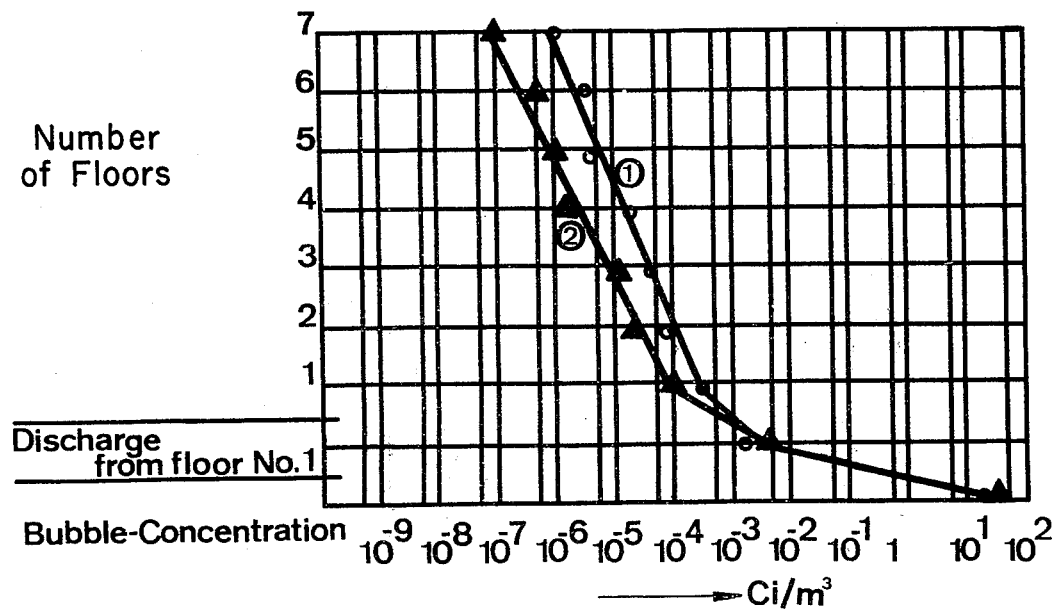

In FIGS. 6 and 7 there is illustrated the course of the decontamination of the radioactive liquid in the column 20.

In Example 1 (FIG. 6) there is treated a liquid with a radioactivity of 2.5 $Ci/m^3$ (Curies per cubic meter). From the curve of FIG. 6 there can be recognized the large drop of the radioactivity from the evaporator 12 to the first floor 32. The curve 1 illustrates the course of the decontamination without guide walls 48, the curve 2 was plotted when using guide walls 48. From this curve it can be recognized that the desired reduction of the radioactivity of the liquid to the desired value of less than approximately $10^{-7}$ $Ci/m^3$ is alread attained at the fifth floor 32. Thus in this case there is a reduction in the number of floors from 7 to 5 in the column 20.

In Example 2 (FIG. 7) there is treated a radioactive liquid of 13 $Ci/m^3$. The curve 1, which portrays the reduction of the radioactivity without guide walls 48, shows that without such it is not possible to reach the desired final or end concentration of $10^{-7}$ when using seven column floors 32. On the other hand, the installation of the guide walls 48 renders possible the use of the existing column 20, since the radioactivity of the liquid at the removal or outfeed duct 44 is below the limit of $10^{-7}$ $Ci/m^3$.

While there is shown and described present preferred embodiments of the invention, it is to be distinctly understood that the invention is not limited thereto but may be otherwise variously embodied and practiced within the scope of the following claims.

Accordingly, what is claimed is:

1. A method of purifying a liquid contaminated with radioactive substances, comprising the steps of: supplying the contaminated liquid into an evaporator with which there is connected a column having a multiplicity of superposed floors, generating vapors in the evaporator, providing a washing reflux liquid, substantially uniformly distributing the washing liquid at the floors, guiding the generated vapors through the washing liquid, said washing liquid flowing at each floor in substantially horizontal countercurrent direction with respect to the vapors, said washing liquid arriving at each floor from a region of lower radioactive concentration of the washing liquid from the superjacent floor and flowing to a region of higher radioactive concentration thereof in the subjacent lower floor, deflecting the washing liquid at each floor a number of times in such a manner that the washing liquid together with droplets entrained by and in the vapors are substantially uniformly admixed, impeding the flow of vapors in the vertical direction at each floor by confining the vapors above the liquid thereon to relatively close proximity with the liquid surface, controlling the flow of the vapors in horizontal direction along each floor so that at least a portion of the vapors flow towards the infeed region of lower radioactive concentration of the washing liquid on each floor, to thereby force at least a portion of the washing liquid and the droplets entrained by the vapors to move countercurrently in the direction of said region of lower radioactive concentration, the forced back droplets thus being intensively commingled with the washing liquid in order to increase the removal of the droplets entrained by the vapors into the washing liquid and to subject the washing liquid to an intensive substantially constant intake of the radioactive substances.

2. An apparatus for the purification of a liquid contaminated with radioactive substances, comprising an evaporator, a column operatively connected with the evaporator and superposed thereabove, said column having an enclosing wall and a multiplicity of floors, each floor having operatively associated therewith an infeed connection for a washing liquid and an outfeed connection for the washing liquid with an associated infeed weir and outfeed weir respectively, said washing liquid tending to flow from said infeed connection defining a region where there is present washing liquid possessing a lower radioactive concentration, to the outfeed connection defining a region where there is present washing liquid possessing a higher radioactive concentration, each floor being provided with nipple throughpassage means permitting the throughpassage substantially only of vapors and entrained droplets generated in the evaporator from one floor to the next higher situated floor, and bubble cap means cooperating with said throughpassage means to impede the flow of vapors in vertical direction at the region of each floor and to impart a substantially horizontal flow component to at least a portion of the vapors such that at least a portion of the vapors and droplets entrained thereby and a portion of the washing liquid move in a substantially horizontal direction counter to the general washing liquid flow at each floor towards the region of lower radioactive concentration to force at least a portion of the washing liquid and the droplets entrained by the vapors to move back towards the region of lower radioactive concentration for intimate admixing of droplets with the washing liquid and to intensify removal of the droplets along with their radioactive substances into the washing liquid, and a multiplicity of substantially vertical guide walls arranged between the infeed weir and the outfeed weir, said guide walls having ends which together with the column wall define passageways for the washing liquid.

3. The apparatus as defined in claim 2, wherein the guide walls are of greater elevational height than the infeed weirs and outfeed weirs.

4. The apparatus as defined in claim 2, wherein the guide walls are at substantially right angles to the general washing liquid flow path between the infeed connection and the outfeed connection.

5. The apparatus as defined in claim 2, wherein the guide walls contain openings at their edges contacting the floors.

6. The apparatus as defined in claim 5, wherein the openings of the guide walls have associated therewith vapor throughpassage openings defined by said throughpassage means in the floor.

7. The apparatus as defined in claim 6, wherein the openings in the guide walls are baffled in the direction of the infeed connection by obstruction walls.

* * * * *